(12) United States Patent
Duffield et al.

(10) Patent No.: US 8,005,949 B2
(45) Date of Patent: Aug. 23, 2011

(54) VARIANCE-OPTIMAL SAMPLING-BASED ESTIMATION OF SUBSET SUMS

(75) Inventors: Nicholas Duffield, Summit, NJ (US);
Carsten Lund, Berkeley Heights, NJ (US); Mikkel Thorup, Florence, MA (US); Edith Cohen, Berkeley Heights, NJ (US); Haim Kaplan, Hod Hasharon (IL)

(73) Assignee: AT&T Intellectual Property I, LP, Atlanta, GA (US)

( * ) Notice: Subject to any disclaimer, the term of this patent is extended or adjusted under 35 U.S.C. 154(b) by 222 days.

(21) Appl. No.: 12/325,340

(22) Filed: Dec. 1, 2008

(65) Prior Publication Data

US 2010/0138529 A1    Jun. 3, 2010

(51) Int. Cl.
*G06F 15/173* (2006.01)

(52) U.S. Cl. ........ 709/224; 709/223; 370/232; 702/179; 702/182

(58) Field of Classification Search .................. 709/223, 709/224; 370/232; 702/179, 182
See application file for complete search history.

(56) References Cited

U.S. PATENT DOCUMENTS

| | | | |
|---|---|---|---|
| 5,721,896 A | 2/1998 | Ganguly et al. | |
| 5,870,752 A | 2/1999 | Gibbons et al. | |
| 6,012,064 A | 1/2000 | Gibbons et al. | |
| 7,191,181 B2 | 3/2007 | Chaudhuri et al. | |
| 7,193,968 B1 | 3/2007 | Kapoor et al. | |
| 7,287,020 B2 | 10/2007 | Chaudhuri et al. | |
| 7,293,037 B2 | 11/2007 | Chaudhuri et al. | |
| 7,293,086 B1 | 11/2007 | Duffield et al. | |
| 7,536,396 B2 * | 5/2009 | Johnson et al. ........ 1/1 | |
| 2005/0131946 A1 * | 6/2005 | Korn et al. .......... 707/104.1 | |
| 2007/0016666 A1 | 1/2007 | Duffield et al. | |
| 2007/0226188 A1 * | 9/2007 | Johnson et al. ........ 707/3 | |
| 2008/0259809 A1 * | 10/2008 | Stephan et al. ........ 370/252 | |

OTHER PUBLICATIONS

Duffield, N., Lund, C., and Thorup, M., "Priority sampling for estimation of arbitrary subset sums", J. ACM 54, 6 (Dec. 2007).*
Duffield, N., Lund, C., and Thorup, M., "Learn more, sample less: Control of volume and variance in network measurement", IEEE Transactions in Information Theory 51, 5 (2005), 1756-1775.*
Alon, N., Duffield, N., Lund, C., and Thorup, M., "Estimating arbitrary subset sums with few probes", in Proceedings of the Twenty-Fourth ACM SIGMOD-SIGART-SIGART Symposium on Principles of Database Systems (Baltimore, Maryland, Jun. 13-15, 2005).*
Johnson, T., Muthukrishnan, S., and Rozenbaum, I. "Sampling algorithms in a stream operator", in Proceedings of the 2005 ACM SIGMOND international Conference on Management of Data (Jun. 2005).*

(Continued)

Primary Examiner — Dohm Chankong
(74) Attorney, Agent, or Firm — Hoffmann & Baron, LLP

(57) ABSTRACT

The present invention relates to a method of obtaining a generic sample of an input stream. The method is designated as $VAROPT_k$. The method comprises receiving an input stream of items arriving one at a time, and maintaining a sample S of items i. The sample S has a capacity for at most k items i. The sample S is filled with k items i. An $n^{th}$ item i is received. It is determined whether the $n^{th}$ item i should be included in sample S. If the $n^{th}$ item i is included in sample S, then a previously included item i is dropped from sample S. The determination is made based on weights of items without distinguishing between previously included items i and the $n^{th}$ item i. The determination is implemented thereby updating weights of items i in sample S. The method is repeated until no more items are received.

17 Claims, 1 Drawing Sheet

OTHER PUBLICATIONS

Steiner, Ralph, "Learn More, Sample Less: Control of volume and Variance in Network Measurement," May 30, 2008, accessed from: http://www.dbis.ethz.ch/education/ss2008/ss08_dbs_algodbs/SteinerTalk.pdf.*

Cohen, "Size-Estimation Framework with Applications to Transitive Closure and Reachability," *Journal of Computer and System Sciences* 5:441-453, 1997.

Cohen et al., "Sketching Unaggregated Data Streams for Subpopulation-Size Queries," *Proc of the 2007 ACM Symp. On Principles of Database Systems*, 2007.

Cohen et al., "Bottom-k Sketches: Better and More Efficient Estimation of Aggregates," *SIGMETRIC'07* Jun. 12-16, San Diego, CA, USA, 2007.

Cohen et al., "Spatially-Decaying Aggregation Over a Network: Model and Algorithms," *SIGMOND 2004*, Jun. 13-18, Paris, France, pp. 707-718, 2004.

Cohen et al., "Summarizing Data Using Bottom-k Sketches," *PODC'07* Aug. 12-15, 2007 Portland, Oregon, USA, 2007.

Cranor et al., "Gigascope: A Stream Database for Network Applications," *SIGMOD* 2003, Jun. 9-12, San Diego, CA, pp. 647-651, 2003.

Estan et al., "Building a Better NetFlow," *SIGCOMM'04* Aug. 30-Sep. 3, Portland, Oregon, USA, pp. 245-256, 2004.

Estan et al., "New Directions in Traffic Measurement and Accounting," *SIGCOMM'02*, Aug. 19-23, 2002 Pittsburgh, PA, USA, pp. 323-336, 2002.

Gibbons et al., "New Sampling-Based Summary Statistics for Improving Approximate Query Answers," *SIGMOD'98*, Seattle, WA, USA, pp. 331-342, 1998.

Hellerstein et al., "Online Aggregation," *SIGMOD'97* AZ, USA, pp. 171-182, 1997.

Hohn et al., "Inverting Sampled Traffic," *IMC'03* Oct. 27-29, Miami Beach, FL, USA, 2003.

Keys et al., "A Robust System for Accurate Real-time Summaries of Internet Traffic," *SIGMETRICS'05*, Jun. 6-10, Banff, Alberta, Canada, pp. 85-96, 2005.

Kumar, et al., "A Data Streaming Algorithm for Estimating Subpopulation Flow Size Distribution," *SIGMETRICS'05*, Jun. 6-10, Banff, Alberta, Canada, pp. 61-72, 2005.

Ramabhadran et al., "Efficient Implementation of a Statistics Counter Architecture," *SIGMETRICS'03*, Jun. 10-14, San Diego, CA, USA, 2003.

Ribeiro, et al., "Fisher Information of Sampled Packets: an Application to Flow Size Estimation," *IMC'06*, Oct. 25-27, Rio de Janeiro, Brazil, 2006.

Shah et al., "Maintaining Statistics Counters in Router Line Cards," 2002 IEEE, pp. 76-81.

Szegedy et al., "On the Variance of Subset Sum Estimation," ESA 2007, LNCS 4698, pp. 75-86. 2007.

* cited by examiner

VARIANCE-OPTIMAL SAMPLING-BASED ESTIMATION OF SUBSET SUMS

FIELD OF THE INVENTION

The present invention is related to statistical summaries of traffic and the recovery of information associated with the traffic and arbitrary subpopulations of traffic flows.

BRIEF DESCRIPTION OF THE RELATED ART

In a high volume stream of weighted items, items arrive faster and in larger quantities than can be saved. Only a sample can be stored efficiently. A method by which to accurately estimate the total weight of arbitrary subsets is a fundamental and practical problem.

This is the basic function used in a database system for streams in Johnson et al., *Proc. ACM SIGMOD*, pp. 1-12, (2005). Such a sampling function is now integrated in Gigascope (Cranor et al., "A stream database for network applications." *Proceedings of the ACM SIGMOD*, 2003), a measurement system that has been deployed for Internet traffic analysis. In this context, items are records summarizing the flows of IP packets streaming by a router. Queries on subsets can be used for numerous current and potential applications, including anomaly detection (detecting unusual traffic patterns by comparing to historic data), routing (estimating traffic volume between Autonomous System (AS) pairs), and billing (estimating volume of traffic to or from a certain source or destination).

SUMMARY OF THE INVENTION

From a high volume stream of weighted items, it is desirable to maintain a generic sample of a certain limited size k that can later be used to estimate the total weight of arbitrary subsets. Viewing the generic sample as a reservoir is the classic context of on-line reservoir sampling.

In one embodiment, the present invention is an efficient reservoir sampling scheme, VAROPT$_k$, that provides a substantial improvement in terms of estimation quality. VAROPT$_k$ provides variance optimal unbiased estimation of subset sums. More precisely, if n items of the stream have been seen, then for any subset size m, the present invention scheme based on k samples minimizes the average variance over all subsets of size m. In fact, the present invention is the first online scheme with this property and the optimality is against any off-line sampling scheme tailored for the concrete set of items seen: no off-line scheme based on k samples can perform better than this on-line scheme when it comes to average variance over any subset size.

In addition to optimal average variance, the present invention scheme provides tighter worst-case bounds on the variance of particular subsets than previously possible, even by an off-line scheme. It is efficient, handling each new item of the stream in O(log k) time, which is optimal even on the word RAM. It is also particularly well suited for a combination of samples from different streams in a distributed setting.

In one embodiment, the present invention is a method of obtaining a generic sample of an input stream. The method includes receiving an input stream of items essentially arriving one at a time and maintaining a sample S of items i, wherein the sample S has a capacity for at most k items i, and filling the sample S with k items i. Upon receipt of an n$^{th}$ item i, it is determined whether the n$^{th}$ item i should be included in sample S, wherein if the n$^{th}$ item i is included in sample S, then a previously included item i is dropped from sample S. The determination is made based on weights of items i without distinguishing between previously included items i and the n$^{th}$ item i. By implementing the determination, weights of items i in sample S are updated. Items may continue to be received. With receipt of each new n$^{th}$ item i, the current sample S is updated until no more items are received.

In a preferred embodiment, a method of obtaining a generic sample of an input stream, associated with a computer network, is provided. The method includes generating a Sample S from an input stream of items i, wherein the Sample S comprises, or consists of, at most k items i. It is then determined whether an n$^{th}$ item i of the input stream should be included in sample S, wherein n=k+1, while maintaining at most k items i in Sample S. The determination is made by computing a VAROPT$_k$ sample of a set I of the n items i. That is, set I includes the original k items i plus the n$^{th}$ item i. A threshold $\tau_k$ is computed such that $\Sigma_{i \in [n]} \min\{1, \tilde{w}_i/\tau_k\}=k$, wherein $\tilde{w}_i$ is adjusted weight of item i. An item i is included in Sample S with probability $p_i=\min\{1, \tilde{w}_i/\tau_k\}$ and an item i is dropped with probability $q_i=1-p_i$, wherein $\Sigma_{i \in I} q_i=n-k=1$. A unit interval [0,1] is partitioned into a segment of size $q_i$ for each i with $q_i>0$. A random point $r \in [0,1]$ is picked, wherein r hits the interval of some $d \in I$, wherein d is a dropped item. Item d is dropped and Sample S is set to equal $I\setminus\{d\}$, thereby updating Sample S. Then setting the following: $\tilde{w}_i=\tau_k$ for each $i \in S$ with $\tilde{w}_i<\tau_k$, thereby obtaining a generic sample of the input stream. In one embodiment, the expected number of times that the threshold passes an adjusted weight, in the sample S, is bounded by $k(\ln(n/k)+O(1))$.

In one embodiment, VAROPT$_k$([n])=VAROPT$_k$(VAROPT$_k$([n-1])∪{n}), wherein [n]={1, ..., n} is the set of sampled items.

In one embodiment, a weight estimate is unbiased so that $E[\hat{w}_i]=w_i$. An unbiased estimate is $\hat{w}_i=w_i/\Pr[i \in S]$ if $i \in S$. In one embodiment, for each item $i \in S$, a weight estimate $\tilde{w}_i$ is stored on-line.

In one embodiment, there are no positive covariances between a pair of item estimates. The average variance ($V_m$) of weight estimates is simultaneously minimized over subsets. $\Sigma V$ and $V\Sigma$ are minimized, where $\Sigma V$ is the sum of individual variances and wherein $V\Sigma$ is the variance of the estimate of total, so that $$\Sigma V = \sum_{i \in [n]} \text{Var}[\hat{w}_i] = nV_1 \text{ and } V\Sigma = \text{Var}\left[\sum_{i \in [n]} \hat{w}_i\right] = \text{Var}[\hat{w}_{[n]}] = V_n.$$

In one embodiment, I has weight-bounded variance of $\text{Var}[\hat{w}_I] \leq w_I w_{[n]}/k$. In one embodiment, I has a cardinality-bounded variance $\text{Var}[\hat{w}_I] \leq |I|(w_{[n]}/2k)^2$.

In one embodiment, each item of the input stream is sampled in O(log k) worst-case time. Preferably, the weighted items are not sorted before estimation. Preferably, the time to sample items from an input stream is about 5% to about 10% slower than time required to receive the items.

In one embodiment, the method of the invention is used to estimate total weight of a subset. The subset can belong to, for example, a specified protocol or to a particular application; or can originate from a specified source. Queries on subsets can be posed for applications selected from the group consisting of anomaly detection, routing and billing.

Other objects and features of the present invention will become apparent from the following detailed description considered in conjunction with the accompanying drawings.

It is to be understood, however, that the drawings are designed as an illustration only and not as a definition of the limits of the invention.

DETAILED DESCRIPTION OF THE EMBODIMENTS

Figure 1:
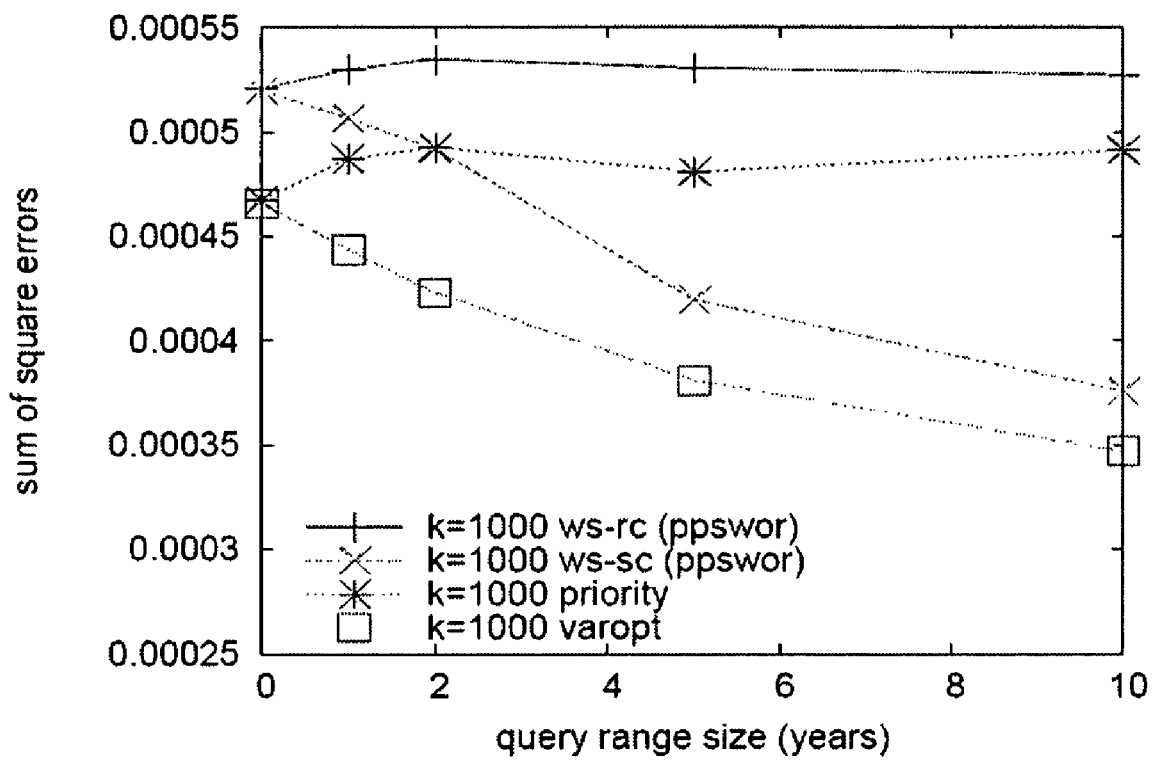
FIG. 1 shows a comparison of priority sampling, ppswor with rank-conditioning estimator, ppswor with subset-conditioning estimator, and VAROPT. The sum of the square errors of the estimates over each partition is averaged over 500 repetitions of the respective summarization method.

The present invention introduces a novel sampling and estimation scheme for streams, denoted by $VAROPT_k$, which selects k samples from n items. A generic sample of a certain limited size is maintained that can be later used to estimate the total weight of arbitrary subsets. $VAROPT_k$ has several important qualities. All estimates are unbiased. The scheme is variance optimal in that it simultaneously minimizes the average variance of weight estimates over subsets of every size m<n. The average variance optimality is complemented by optimal worst-case bounds limiting the variance over all combinations of input streams and queried subsets. These pre-subset worst-case bounds are critical for applications for requiring robustness and for the derivation of confidence intervals. Furthermore, $VAROPT_k$ has a very fast implementation. In the implementation, the time to sample 1,000 items from a stream of 10,000,000 items is only 7% slower than the time required to read them.

One of the main contributions of the invention is the design of a scheme that has all these qualities. An important part of the contribution is identifying these desirable optimal qualities and establishing that they can all be realized by a single scheme. $VAROPT_k$ is the generic reservoir sampling scheme for estimation of subset sums.

Ignoring the streaming aspect, the above qualities coincide with classic objectives in statistics (see Section 1.7). With $VAROPT_k$, these classic objectives are satisfied in a streaming context. In Section B (FIG. 1), there is a demonstration of the benefit of $VAROPT_k$ via an experimental comparison on the Netflix Prize data set (http://www.netflixprize.com/).

1.1 Reservoir Sampling with Unbiased Estimation.

The problem considered is classically known as reservoir sampling. (See D. E. Knuth. *The Art of Computer Programming. Vol 2: Seminumerical Algorithms*. pp. 138-140 Addison-Wesley, 1969.) In reservoir sampling, a stream of (weighted) items is processed. The items arrive one at the time, and a reservoir maintains a sample S of the items seen thus far. When a new item arrives, it may be included in the sample S and old items may be dropped from S. Old items outside S are never reconsidered. Estimation is an integral part of sampling. Ultimately, a sample is used to estimate the total weight of any subset of the items seen so far. Fixing notation, a stream of items, where item i has a positive weight $w_i$, is assessed. For some integer capacity $k \geq 1$, a reservoir S is maintained with capacity for at most k samples from the items seen thus far. Let $[n]=\{1, \ldots, n\}$ be the set of items seen. With each item i∈S, a weight estimate $\hat{w}_i$, is stored which is also referred to as adjusted weight. For items i∈[n]\S, there is an implicit zero estimate $\hat{w}_i=0$. These estimators are required to be unbiased in the sense that $E[\hat{w}_i]=w_i$. A typical example is the classic Horvitz-Thompson estimator setting $\hat{w}_i=w_i/\Pr[i \in S]$ if i∈S (See Horvitz et al., *J. Amer. Stat. Assoc.* 47(260): 663-685 (1952).)

One of the purposes of the invention is to estimate arbitrary subset sums from the sample. For any subset $I \subset [n]$, let $w_I$ and $\hat{w}_I$ denote $\Sigma_{i \in I} w_i$ and $\Sigma_{i \in I} \hat{w}_i$, respectively. By linearity of expectation, $E[\hat{w}_I]=w_I$. Since all unsampled items have 0 estimates, $\hat{w}_{I \cap S}=\hat{w}_I$. Thus, $\hat{w}_{I \cap S}$, the sum of the adjusted weights of items from the sample that are members of I, is an unbiased estimator of $w_I$.

Reservoir sampling thus addresses two issues:

The streaming issue of computing a sample from a huge stream that passes by only once with limited memory. (See S. Muthukrishnan. *Foundations and Trends in Theoretical Computer Science* 1(2) (2005)).

The incremental data structure issue of maintaining a sample as new weighted items are inserted. In one case, the sample is used to provide quick estimates of sums over arbitrary subsets of the items seen thus far.

Reservoir versions of different sampling schemes are presented in Chaudhuri et al., In *Proc. ACM SIGMOD Conference*, pp. 263-274 (1999); Cohen et al., "Summarizing data using bottom-k sketches" In *Proc. 26th ACM PODC* (2007); Duffield et al., "Priority sampling for estimation of arbitrary subset sums" *J. ACM*, 54(6):Art. 32 (December, 2007); Fan et al., *J. Amer. Stat. Assoc.*, 57:387-402 (1962); Efraimidis et al., *Inf. Process. Lett.*, 97(5):181-185 (2006); and J. S. Vitter. *ACM Trans. Math. Softw.*, 11(1):37-57, 1985.

$VAROPT_k$ is differentiated from prior art schemes by a particularly clean design: Other schemes derive the adjusted weights, including the final ones, using auxiliary information, e.g., the total weight seen thus far. $VAROPT_k$ maintains adjusted weights as part of the on-line process without any additional auxiliary information. More precisely, $VAROPT_k$ does not distinguish between previously-sampled items with adjusted weights and a new item with its original weights. $VAROPT_k$ processes a new item from the data stream by applying variance-optimal sampling of k out of k+1 items that include the current reservoir and the new item without distinction. Surprisingly, each such "local" step is uniquely determined by variance-optimality and that global variance optimality follows.

A preferred embodiment of the present invention is a method of obtaining a generic sample of an input stream (i.e., $VAROPT_k$). A generic sample is a sample that can be used to estimate the total weight of arbitrary subsets. An input stream is any data essentially being evaluated one at a time. An example is an IP packet stream, or IP flow records produced by a summarization module at a router. In the method, an input stream of items arriving essentially one at a time is received. Typically, the items are received into a fabric or network.

An identifier of an item can be designated as "i." In one embodiment, item i is an identifier with a numeric weight value. For example, an item i can be an IP Flow record x weighted by the number of packets in Flow x. The more packets Flow x has, the greater the weight of the item i.

A sample S of items i is maintained. The sample S has a capacity for at most k items i. As items i arrive, they are added to sample S. Sample S proceeds to become filled with k items i.

After Sample S is filled with k items i, an $n^{th}$ item i is received. It is then determined whether the $n^{th}$ item i should be included in Sample S. The determination is made based on weights of items i without distinguishing between previously included items i and the $n^{th}$ item i. If the $n^{th}$ item i is included in Sample S, then a previously included item i is dropped from Sample S. The determination is implemented thereby updating weights of items i in Sample S. This updated Sample S is the "current Sample S."

Next, another $n^{th}$ item i is received. It is then again determined whether this $n^{th}$ item i should be included in Sample S, i.e., the current Sample S, as described above, thereby updating the current Sample S. The method proceeds in the same manner with each new $n^{th}$ item i received. Each time Sample S is updated, it becomes the "current sample S."

Sample S at any point is a sample of all the items (e.g., flows) processed so far. When there are less than k items (e.g., k flows), Sample S contains all of them. Sample S at the end of processing is the sample of the input stream.

Each item in Sample S has a numeric weight associated with it. These weights can be used to obtain an estimate of the weight of a subpopulation of the items processed so far, by summing the weights of the items that are in the Sample S and are members of the subpopulation.

1.2 Off-Line Sampling.

When considering the qualities of the sample, the on-line scheme of the invention, $VAROPT_k$, is compared with a powerful arbitrary off-line sampling scheme which gets the n weighted items up front, and can tailor the sampling and estimation freely to this concrete set, not having to worry about efficiency or the arrival of more items. The only restriction being the bound k on the number of samples. More abstractly, the off-line sampling scheme is an arbitrary probability distribution $\Omega$ over functions $\hat{w}$: $[n] \rightarrow R$ from items i to weight estimates $\hat{w}_i$ which is unbiased in the sense that $E_{\hat{w} \leftarrow \Omega}[\hat{w}_i] = w_i$, and which has at most k non-zeros.

1.3 Average Variance Optimality.

When n items have arrived, for each subset size $m \leq n$, consider the average variance for subsets of size $m \leq n$:

$$V_m = E_{I \subseteq [n], |I|=m}[\mathrm{Var}[\hat{w}_I]] = \left(\sum_{I \subseteq [n], |I|=m}[\mathrm{Var}[\hat{w}_I]]\right) \Big/ \binom{n}{m}.$$

$VAROPT_k$ is variance optimal in the following strong sense. For each reservoir size k, stream prefix of n weighted items, and subset size m, there is no off-line sampling scheme with k samples getting a smaller average variance $V_m$ than generic $VAROPT_k$.

The average variance measure $V_m$ was introduced in Szegedy et al., In *Proc. 15th ESA, LNCS* 4698, pp. 75-86 (2007) where it was proven that $$V_m = \frac{m}{n}\left(\frac{n-m}{n-1}\Sigma V + \frac{m-1}{n-1}V\Sigma\right), \quad (1)$$

for any sampling and estimation scheme. Here $\Sigma V$ is the sum of individual variances while $V\Sigma$ is the variance of the estimate of the total, that is, $$\Sigma V = \sum_{i \in [n]} \mathrm{Var}[\hat{w}_i] = nV_1 \text{ and } V\Sigma = \mathrm{Var}\left[\sum_{i \in [n]}\hat{w}_i\right] = \mathrm{Var}[\hat{w}_{[n]}] = V_n. \quad (2)$$

It follows that $V_m$ is minimized for all m if and only if $\Sigma V$ and $V\Sigma$ is simultaneously minimized which is what $VAROPT_k$ does. The optimal value for $V\Sigma$ is 0, meaning that the estimate of the total is exact.

Let $W_p$ denote the expected variance of a random subset including each item i independently with some probability p. It is also shown in Szegedy et al. that $W_p = p((1-p)\Sigma V + pV\Sigma)$. So if $\Sigma V$ and $V\Sigma$ are simultaneously minimized, $W_p$ is also minimized. It should be noted that both $\Sigma V$ and $V\Sigma$ are known measures from statistics (see, e.g., Särndal et al., *Model Assisted Survey Sampling*. Springer (1992); and concrete examples in the next section). It is the implications for average variance over subsets that are from Szegedy et al.

With no information given about which kind of subsets are to be estimated, it makes most sense to optimize average variance measures like those above giving each item equal opportunity to be included in the estimated subset. If the input distributions are not too special, then this will give the best estimates in practice, using variance as the classic measure for estimation quality.

$VAROPT_k$ is the first reservoir sampling scheme that minimizes the average variance $V_m$ for any subset size $m < n$. Priority sampling has an almost optimal $V_1$, that is, it needs an extra sample to obtain the optimal $\Sigma V$. (See Duffield et al., *J. ACM*, 54(6):Art. 32, December, 2007.) For $m > 1$, priority sampling is not variance optimal: priority sampling has zero covariance between items, hence $V\Sigma = \Sigma V$. This makes a bigger difference for larger subset sizes m. With the optimal $V\Sigma = 0$, by (1), $$V_m = \frac{m}{n}\frac{n-m}{n-1}\Sigma V,$$

whereas priority sampling with $V\Sigma = \Sigma V$ has $$V_m = \frac{m}{n}\Sigma V.$$

Hence, more than a factor $$\frac{n-1}{n-m}$$

is gained over priority sampling for subsets of size m. Similarly, considering $W_{1/2}$, expected variance for uniformly distributed subsets is less than half of that with priority sampling.

1.4 Worst-Case Robustness.

In addition to minimizing the average variance, $VAROPT_k$ has some complimentary worst-case robustness properties, limiting the variance for every single (arbitrary) subset. Note that any such bound has to grow with the square of a scaling of the weights. The robustness is important for applications seeking to minimize worst-case vulnerability.

Non-positive covariances between items. With $VAROPT_k$, there is no positive covariance between any pair of item estimates. The importance of this feature was explicitly advocated in Cohen et al., (In *Proc. ACM I F1P Conference on Measurement and Modeling of Computer Systems (SIGMETRICS/Performance)* pp. 353-354 (2007)), but it is also standard in statistics to worry about positive covariances (see, e.g., Särndal et al., p. 92]). It implies that good variances for individual items do not get destroyed when summing over subsets: as when adding independent random variables, the variance of the sum is at most the sum of the individual variances. In contrast, the classic systematic sampling scheme that minimizes per-item variances has large positive covariances between some items, leading to large variances for certain subsets.

Weight-bounded variances. Another feature of $VAROPT_k$ is that there is weight-bounded individual variances in the sense that each item i has $\mathrm{Var}[\hat{w}_i] < w_i w_{[n]}/k$. This is an optimal worst-case bound in the sense that no sampling scheme can get a better leading constant. The bound is asymptotically tight if every i has $w_i = o(w_{[n]}/k)$, e.g., when sampling k out of n units, the individual variance is $(n/k)-1$. In combination with non-positive covariances, every subset I has weight-bounded variance $Var[\hat{w}_I] \leq w_I w_{[n]}/k$.

Cardinality-bounded variances. A related feature of $VAROPT_k$ is that every item has variance bounded by $(w_{[n]}/2k)^2$. This is an optimal worst-case bound in the sense that no sampling scheme can get a better leading constant. The bound tight for n=2k unit items. Combined with non-positive covariances, every subset I has a cardinality-bounded variance $Var[\hat{w}_I] \leq |I|(w_{[n]}/2k)^2$.

1.5 Efficient for Each Item.

With $VAROPT_k$, each new item of the stream is handled in O(log k) worst-case time. In a realistic implementation with floating point numbers, there is some precision $\wp$ and an error of $2^{-\wp}$ is accepted. There is a matching lower bound of $\Omega(\log k)$ on the word RAM for any floating point implementation of a reservoir sampling scheme with capacity for k samples which minimizes $\Sigma V$. Note that there are faster schemes if one does not worry about variance, e.g., uniform sampling can be implemented in constant worst-case time (Fan et al.) and subconstant average time (J. S. Vitter). A proof of the lower bound is sketched in Section D. In Section A, a simpler amortized implementation in O(log log k) time is further provided, and results in O(n+k(log log k)(log n)) expected total time for randomly permuted streams. Finally, the scheme is ideally suited for parallel and distributed settings.

1.6 Known Sampling Schemes.

Known sampling schemes in relation to the qualities of the scheme of the present invention are discussed herein, including average variance optimality for any subset size; robustness; and efficient reservoir sampling implementation with capacity for at most k samples.

While many prior sampling schemes share some of these qualities, they all perform significantly worse on others. For example, many sampling schemes from statistics, such as Sunter's method (A. B. Sunter, *Applied Statistics*, 26:261-268, 1977), are not suitable in the reservoir sampling context because they need to sort the items before deciding which ones to sample. Note that the statistics literature contains many sampling schemes with many different features, and only a select few most relevant schemes are discussed here.

Particular focus is on heavy-tailed distributions (such as power-low distributions) that frequently occur in practice. In these distributions, a small fraction of dominant items accounts for a large fraction of the total weight (Adler et al., *A Practical Guide to Heavy Tails*. Birkhauser, 1998; and Park et al., In *Proc. 4th IEEE Int. Conf Network Protocols (ICNP)*, 1996).

Uniform sampling without replacement. In uniform sampling without replacement, a sample of k items is picked uniformly at random. If item i is sampled, it gets the Horvitz-Thompson weight estimate $\hat{w}_i = w_i n/k$. Uniform sampling has obvious variance problems with heavy-tailed distribution because it is likely to miss the dominant items.

Probability proportional to size sampling with replacement (ppswr). In probability proportional to size sampling (pps) with replacement (wr), each sample $S_j \in [n]$, $j \in [k]$, is independent, and equal to i with probability $w_i/w_{[n]}$. Then i is sampled if $i = S_j$ for some $j \in [k]$. This happens with probability $p_i = 1 - (1-w_i/w_{[n]})^k$, and if i is sampled, it gets the Horvitz-Thompson estimator $\hat{w}_i = w_i/p_i$. Other estimators have been proposed, but have the same problem with heavy-tailed distributions: if a few dominant items contain most of the total weight, then most samples will be copies of these dominant items. As a result, comparatively few samples of the remaining items are left, and few samples imply high variance no matter which estimates are assigned.

Probability proportional to size sampling without replacement (ppswor). An obvious improvement to ppswr is to sample without replacement (ppswor). Each new item is then chosen with probability proportional to size among the items not yet in the sample. With ppswor, unlike ppswr, the probability that an item is included in the sample is a complicated function of all the item weights, and therefore the Horvitz-Thompson estimator is not directly applicable. A ppswor reservoir sampling and estimation procedure is, however, presented in Cohen et al., In *Proc. ACM IFIP Conference on Measurement and Modeling of Computer Systems (SIGMETRICS/Performance)*, pp. 353-354, 2007; Cohen et al. Summarizing data using bottom-k sketches. In *Proc. 26th ACM PODC*, 2007; and E. Cohen and H. Kaplan. Tighter estimation using bottom-k sketches. In *Proceedings of the 34th VLDB Conference*, 2008.

Even though ppswor resolves the "duplicates problem" of ppswr, a negative result for any ppswor estimator is shown in this specification: In Section C, an instance is constructed for any sample size k and number of items n such that any estimation based on up to k+(ln k)/2 ppswor samples will perform a factor $\Omega(\log k)$ worse than $VAROPT_k$ for every subset size m. This is the first such negative result for the classic ppswor besides the fact that it is not strictly optimal.

Threshold sampling and inclusion probability proportional to size (ipps). In threshold sampling (Duffield et al., *IEEE Transactions on Information Theory* 51(5): 1756-1775, 2005), a fixed threshold r is picked. In the sample S, every item with weight $w_i \geq \tau$ is included, using the original weight as estimate $\hat{w}_i = w_i$. An item i with weight $w_i < \tau$ is included with probability $p_i = w_i/\tau$, and it gets weight estimate $\tau$ if sampled. These are the standard Horvitz-Thompson estimators given the $p_i$.

The inclusion probabilities of threshold sampling are particularly interesting in the present context because they are the unique ones that minimize $\Sigma V$ using an expected number of at most k samples. Therefore, $VAROPT_k$ uses exactly the same inclusion probabilities.

For an expected number of k samples, $\tau = \tau_k$ is used satisfying $$\sum_i p_i = \sum_i \min\{1, w_i/\tau_k\} = k. \quad (3)$$

This $\tau_k$ is unique if k<n. For k≥n, define $\tau_k = 0$ which implies that any possible item is included.

In the special case where all weights are smaller than $w_{[n]}/k$, then $\tau_k = w_{[n]}/k$ and $p_i = w_i/\tau_k$ for all i. Such sampling probabilities are often referred to as inclusion probability proportional to size (ipps) and it is standard that ipps minimizes the total variance $\Sigma V$ among all Poisson sampling schemes with the same expected number of samples (Särndal et al., p. 86). In Duffield et al., *ACM*, 54(6):Art. 32, December, 2007, it is proven that a sampling scheme using at most k samples minimizes $\Sigma V$ relative to any off-line scheme with the same expected number of samples if and only if it uses the above threshold inclusion probabilities with associated Horvitz-Thompson estimator.

Note that $\tau_k \leq w_{[n]}/k$. Moreover, the variance of item i is zero if $w_i \geq \tau$; otherwise it is $w_i(\tau_k - w_i)$. This gives the two individual robustness bounds of $Var[\hat{w}_i] < w_i \tau_k \leq w_i w_{[n]}/k$ and $Var[\hat{w}_i] < (\tau_k/2)^2 \leq (w_{[n]}/(2k))^2$. These bounds hold whenever using the threshold inclusion probabilities from (3). Since threshold sampling has zero covariances (each item is included independently with probability $p_i$), it is concluded that it has both weight-bounded and cardinality-bounded variance for every subset.

In Duffield et al., *ACM*, 54(6):Art. 32, December, 2007, it is shown how to maintain a reservoir sample of expected size k for a stream of weighted items. Threshold sampling, however, has two important caveats, both related to the independent inclusion of items: Firstly, it only maintains an expected number of k samples, which is inappropriate if having a hard capacity constraint of k. Secondly, it has $V\Sigma = \Sigma V$ while $VAROPT_k$ has $V\Sigma = 0$, which means larger variance on larger subpopulations. In particular, as discussed at the end of Section 1.3, this means that threshold sampling is worse by a factor $$\frac{n-1}{n-m}$$

for subsets for size m, and by a factor 2 for a uniformly random subset.

Priority sampling. Priority sampling was introduced in Duffield et al., *ACM*, 54(6):Art. 32, December, 2007 as a threshold style scheme which is tailored for reservoir sampling with k as a hard capacity constraint. It is proven in M. Szegedy, In *Proc. 38th STOC* pp. 150-158 (2006), that priority sampling with k+1 samples get as good $\Sigma V$ as threshold sampling with an expected number of k samples. However, priority sampling has $V\Sigma = \Sigma V$ like threshold sampling, hence the same suboptimality for subsets with more than one element.

Systematic threshold sampling. An off-line sampling scheme that minimizes the average variance $V_m$ for all subset sizes m, but lacks other important properties, is now discussed. Consider the general version of systematic sampling where each item i has a given inclusion probability $p_i$. Contrasting Threshold sampling, inclusions of different items are not independent. Instead, a single uniformly random number $r \in (0,1)$ is picked, and include i in S if and only if for some integer j, $\Sigma_{h<i} p_i \leq j + r < \Sigma_{h \leq i} p_i$. It is not hard to see that $\Pr[i \in S] = p_i$. Let $k = \Sigma_{i \in [n]} p_i$ be the expected number of samples. Then the actual number of samples is either $\lfloor k \rfloor$ or $\lceil k \rceil$. In particular, this number is fixed if k is an integer. Below it is assumed that k is integer.

In systematic threshold sampling, let the $p_i$ be the previously defined threshold probabilities from (3). Therefore, the same optimal sum of individual variance $\Sigma V$ is obtained. In Szegedy et al., *Proc. 15th ESA, LNCS* 4698, pp. 75-86 (2007), it is shown that $V\Sigma = 0$. The fact is that $V\Sigma = 0$ is standard from statistics in the ipps case with no large weights (Särndal et al., pp. 88, 96, 97). Since both $\Sigma V$ and $V\Sigma$ are optimal, it follows that systematic threshold sampling gets optimal average variance for any subset size m.

Systematic threshold sampling, however, has two important caveats: Firstly, it is impossible to implement it in a data stream context: when a new item arrives, one must increase the threshold so as to keep the number of samples fixed. However, with systematic threshold sampling, a small change in threshold may completely change the set of items sampled.

Secondly, one may have large positive covariances between items and these covariances depend on their relative placement in the stream: As an extreme case, if one has n unit items where n is even, and want to sample n/2 items, then systematic sampling will either sample all the even, or all the odd items, leading to maximal possible covariance between items of the same parity. Indeed, it is recommended that the items are shuffled before systematic sampling (Szegedy et al., *Proc. 15th ESA, LNCS* 4698, p. 92 (2007), but that is not possible with reservoir sampling. Moreover, one may have positive covariances even with shuffling.

Thus, even though systematic threshold sampling satisfies optimal average variances, it is rejected because it cannot be implemented as a stream algorithm and it lacks worst-case robustness.

A preferred embodiment of the present invention follows. $VAROPT_k$ provides optimal average variance for any subset size m, like systematic threshold sampling, and it fixes the above mentioned issues with systematic sampling. $VAROPT_k$ works for reservoir sampling, maintaining a reservoir of size k that at any time is variance optimal with respect to the stream seen so far. Moreover, $VAROPT_k$ is robust with no positive covariances and weight-bounded variance for every subset. Finally $VAROPT_k$ is efficient in the sense that it only spends O(log k) time on each new item. Section B (FIG. 1) illustrates the advantages of $VAROPT_k$ using a real-life data set.

1.7 Some of the Advantages of VAR<sub>OPT</sub>.

Many of the non-streaming objectives satisfied by $VAROPT_k$ are classic objectives from statistics. As stated in 1977 by Sunter (*Applied Statistics*, 26:261-268, 1977), a great deal of importance has been attached to the development of without replacement sampling schemes such that:

1. The individual inclusion probabilities are proportional to size (ipps). Ipps is only defined when no weight is more than a fraction 1/k of the total, which is a typical assumption in statistics (Särndal et al.). In that case the $p_i$ in (3) are ipps, so $VAROPT_k$ satisfies ipps.
2. The total is exact, as for $VAROPT_k$.
3. Positive joint pairwise probabilities, that is, including one item does not exclude another item.
    This objective is not on the list. It is only possible with $k \geq 2$ samples, and then it is satisfied by $VAROPT_k$.
4. Strictly negative covariances.
    This is satisfied by $VAROPT_k$ when ipps is defined.
5. Fixed sample size k—as for $VAROPT_k$.

One of the important novel features of $VAROPT_k$ is that it can perform reservoir sampling from a stream. For contrast, Sunter's scheme will first sort the items, and then process them in order of decreasing size, and that does not work for streaming. Also, $VAROPT_k$ has the classic systematic sampling that works for a stream if the inclusion probabilities are given, but which violates both the positive joint probabilities and the negative covariances. The $VAROPT_k$ scheme can be seen as a superior alternative to systematic sampling if one has k and treats the given probabilities as weights.

Statisticians have never found a reasonable scheme achieving all the above mentioned objectives of Sunter, e.g., Sunter's scheme only satisfies ipps approximately, and more recent books like Brewer et al., *Sampling With Unequal Probabilities, Lecture Notes in Statistics*, vol 15. Springer, New York, 1983; and Särndal et al. only mention schemes with different caveats relative to these objectives. The present invention, $VAROPT_k$, solves a thirty year old off-line challenge from statistics, and it does so with an on-line reservoir sampling scheme.

2. $VAROPT_k$ $VAROPT_k$ includes any scheme for sampling at most k items which satisfy the following properties:

(i) Uses the threshold inclusion probabilities $p_i$ from (3) with associated Horvitz-Thompson estimators.

This implies optimal ΣV and weight-bounded and bounded individual variances.

(ii) Gets the total exact, hence VΣ=0.

Together with (i) this gives optimal average variance for any subset size m.

(iii) Has no positive covariances.

Together with (i) this gives robustness in terms of weight-bounded and cardinality-bounded variance for every subset (c.f. Section 1.4).

These properties imply all aforementioned variance qualities.

As mentioned above, a clean design that differentiates $VAROPT_k$ scheme from prior art schemes is that one can just sample from samples without relying on auxiliary data. To make sense of this statement, let all sampling schemes operate on some adjusted weights, which initially are the original weights. When sampling some items with adjusted weight, use the resulting weight estimates as new adjusted weights.

A simple recurrence. As a simple base case, an implementation $VAROPT_{k,\,k+1}$ of $VAROPT_k$ is presented for n=k+1 items. To deal with streams with n>k+1 items, the following recurrence will be proven and used $$VAROPT_k([n])=VAROPT_k(VAROPT_k([n-1])\cup\{n\}) \quad (4)$$

With (4), one immediately gets a $VAROPT_k$ reservoir sampling algorithm: the first k items fill the initial reservoir. Thereafter, whenever a new item arrives, it is added to the current reservoir sample, which becomes of size k+1. Finally $VAROPT_{k,\,k+1}$ sample is applied to the result. In the application of $VAROPT_{k,\,k+1}$, one does not distinguish between items from the previous reservoir and the new item.

It is easy to see that nothing like (4) works for any of the prior art schemes mentioned above. For example, if $U_{NIF_k}$ denotes uniform sampling of k items associated estimates, then $U_{NIF_k}([n])\ne U_{NIF_k}(U_{NIF_k}([n-1])\cup\{n\})$.

With equality, this formula would say that item n should be included with probability k/(k+1). However, to integrate item n correctly in the uniform reservoir sample, it should only be included with probability k/n. The standard algorithms therefore maintain the index n of the last arrival (Fan et al., *J. Amer. Stat Assoc.* 57:387-402 (1962); and Vitter et al., *ACM Trans. Math. Softw.*, 11(1):37-57 (1985)).

The same issue is found with all the other schemes: ppswr, ppswor, priority, and systematic threshold sampling. For each of these schemes, there is a global description of what the reservoir should look like for a given stream. When a new item arrives, it cannot just be treated like the current items in the reservoir, sampling k out of the k+1 items. Instead some additional information is needed in order to integrate the new item in a valid reservoir sample of the new expanded stream. In particular, priority sampling (Duffield et al., *J. ACM*, 54(6): Article 32 (2007)) and the ppswor schemes (Cohen et al., *Proc. ACM I F1P Conference on Measurement and Modeling of Computer Systems*, pp. 353-354, 2007; Cohen et al. Summarizing data using bottom-k sketches. In *Proc. 26th ACM PODC*, 2007; and Cohen et al., *Proceedings of the 34th VLDB Conference*, 2008) use priorities/ranks for all items in the reservoir, and reservoir threshold sampling (Duffield et al., *IEEE Transactions on Information Theory* 51(5): 1756-1775, 2005; Duffield et al., *J. ACM*, 54(6):Art. 32 (2007)) uses the sum of all weights below the current threshold.

Generalizing from unit weights. The standard scheme for sampling k unit items is variance optimal and $VAROPT_k$ can be considered to be a generalization to weighted items which produces exactly the same sample and estimate distribution when applied to unit weights. (Fan et al., *J. Amer. Stat Assoc.*, 57:387-402 (1962)) and Vitter et al.) The standard scheme for unit items is, of course, much simpler: include the nth item with probability n/k, pushing out a uniformly random old one. The estimate of any sampled item becomes n/k. With $VAROPT_k$, when the nth item arrives, one has k old adjusted weights of size (n−1)/k and a new item of weight 1. Apply the general $VAROPT_{k,\,k+1}$ to get down to k weights. The result ends up the same: the new item is included with probability 1/n, and all adjusted weights become n/k.

However, $VAROPT_k$ is not the only natural generalization of the standard scheme for unit weights. The ppswor schemes also produce the same results when applied to unit weights. However, ppswor and $VAROPT_k$ diverge when the weights are not all the same. The ppswor scheme from Cohen et al., (*Proceedings of the* 34th VLDB Conference, 2008) does have exact total (VΣ=0), but suboptimal ΣV so it is not variance optimal.

Priority sampling is also a generalization in that it produces the same sample distribution when applied to unit weights. However, the estimates vary a bit, and that is why it only optimizes ΣV modulo one extra sample. A bigger caveat is that priority sampling does not get the total exact as it has VΣ=ΣV.

The $VAROPT_k$ scheme of the present invention is the unique generalization of the standard reservoir sampling scheme for unit weights to general weights that preserves variance optimality.

3. The Algorithm.

To complete the recursive $VAROPT_k$ algorithm, it is necessary to prove the validity of recurrence (4) and to implement $VAROPT_{k,k+1}$ for the base case. The following lemma will be used repeatedly.

Lemma 1 Consider an unbiased sampling scheme satisfying (i). Then the exact total of (ii) is equivalent to the following statement:

(iia) If the input has at least k items, then the sample has exactly k items.

Proof. A similar argument was used in Szegedy et al. for systematic threshold sampling. If the input has at most k items, then $\tau_k=0$, and then the sample is the original set meaning that both statements are true. Hence it may be assumed that the input has more than k items, and that implies $\tau_k>0$. From (i), it is known that $w_i\geq\tau$ if and only if i is included in the sample with $\hat{w}_i=w_i$. All remaining items in the sample have estimate $\tau_k$. The number of remaining items being fixed is equivalent to a fixed total. Since the expected number of items is k, the number is fixed if and only if it is k as in (iia). Similarly, since the expected total estimate is unbiased, it is fixed if and only if it is exact as in (ii).

3.1 Base Case.

One embodiment of the implementation of $VAROPT_{k,\,k+1}$ follows. The input is a set I of n=k+1 items i with adjusted weights $\tilde{w}_i$. One wants a $VAROPT_k$ sample of I. First compute the threshold of $\tau_k$ such that $\Sigma_{i\in[n]}\min\{1,\tilde{w}_i/\tau_k\}=k$. One wants to include i with probability $p_i=\min\{1,\tilde{w}_i/\tau_k\}$, or equivalently, to drop i with probability $q_i=1-p_i$. Here $\Sigma_{i\in I}q_i=n-k=1$. Partition the unit interval [0,1] into a segment of size $q_i$ for each i with $q_i>0$. Finally, pick a random point r∈[0,1]. This hits the interval of some d∈I, and then drop d, setting S=I\{d}. For each i∈S with $\tilde{w}_i<\tau_k$ set $\tilde{w}_i=\tau_k$. Finally, return S with these adjusted weights.

Lemma 2 $VAROPT_{k,\,k+1}$ is a $VAROPT_k$ scheme.

Proof. It follows directly from the definition to use threshold probabilities and estimators, so (i) is satisfied. Since one is dropped, exactly k samples are left as in (iia), so (ii) follows from Lemma 1. Finally, one needs to argue that there are no positive covariances. One could only have positive covariances between items below the threshold whose inclusion probability is below 1. Knowing that one such item is included can only decrease the chance that another is included. Since one always gets the same estimate $\tau_k$ if included, it is concluded that the covariance between these items is negative. This settles (iii).

3.2 Recurrence.

It turns out more natural to prove a generalization of (4). Let $I_1, \ldots, I_m$ disjoint non-empty set of weighted items. Then $$VAROPT_k\left(\bigcup_{x \in [m]} I_x\right) = VAROPT_k\left(\bigcup_{x \in [m]} VAROUT_k(I_x)\right) \quad (5)$$

To see that this implies (4), set $m=2, I_1=\{1, \ldots, n-1\}$ and $I_2$ $\{n\}$. Since $VAROPT_k$ has no effect when applied to a singleton, this means that (4) is a special case of (5). The proof of (5) follows.

Let $I = \bigcup_{x \in [m]} I_x$. Use $w_i$ to denote the original weights. For each $x \in [m]$, set $I'_x = VAROPT_k(I_x)$, and use $w'_i$ for the resulting adjusted weights. Set $I' = \bigcup_{x \in [m]} I'_x$. Finally, set $S = VAROPT_k$ (I') and use the final adjusted weights as weight estimates $\hat{w}_i$. Also let $\tau_{x,k}$ be the threshold used in $VAROPT_k(I_x)$ and let $\tau'_k$ be the one used by $VAROPT_k(I')$. It is required to be proven that the right hand side of (5) is a $VAROPT_k$ scheme of I provided the correctness of each internal use of $VAROPT_k$.

First note that the statement is trivial if $m=1$ or $|I| \leq k$, so it may be assumed that $m>1$ and $|I|>k$. Since an unbiased estimator of an unbiased estimator is an unbiased estimator, it follows that the final $\hat{w}_i$ are unbiased estimators of the original weights $w_i$. Since each internal call to $VAROPT_k$ preserves an exact total, it is clear that the combination preserves an exact total, so (ii) is trivially satisfied.

Lemma 3 $\tau'_k > \tau_{x,k}$ for each $x \in [m]$.
Proof Since $m>1$, $\sum_{x \in [m]} |I_x| = |I| > k$, and $|I'_x| = \min\{k, |I_x|\}$ for each $x \in [m]$, one gets that $$|I'| = \sum_{x \in [m]} |I'_x| > k,$$

hence that $\tau'_k > 0$. The statement is thus trivial for x if $|I_x| \leq k$ implying $\tau_{x,k} = 0$.

However, if $|I_x| \geq k$, then from (iia) one gets that $I'_x$ has k items of weight at least $\tau_{x,k}$. Since each of these weights is included in I' and I' has more items, it follows from (3) that $\tau'_k > \tau_{x,k}$.

Lemma 4. The final sample S includes all i with $w_i > \tau'_k$. Moreover, each $i \in S$ has $\hat{w}_i = \max\{w_i, \tau'_k\}$.
Proof. Since $\tau'_k > \tau_{x,k}$, and since (i) hold for each internal $VAROPT_k$, it follows that $i \in I$ has $\hat{w}_i > \tau'_k$ if and only if $w_i > \tau'_k$. It also follows from the correctness of $VAROPT_k(I')$ that no estimate in the sample can be below $\tau'_k$.

Lemma 5. The threshold $\tau'_k$ depends only on I.
Proof. From Lemma 4 it follows that the final total estimate is a growing function of $\tau'_k$, but since this total is exact, it follows that $\tau'_k$ depends only on I.

Lemma 6. The probability that $i \in S$ is $\min\{1, w_i/\tau'_k\}$.
Proof. Lemma 4 gives the result if $w_i \geq \tau'_k$. Suppose $w_i < \tau'_k$. It is known from the correctness of $VAROPT_k(I')$ that $\hat{w}_i = \tau'_k$ if i is in S. Since $\hat{w}_i$ is unbiased, one concludes that it is included with probability $w_i/\tau'_k$.

Lemma 7. $\tau'_k$ is equal to the threshold $\tau_k$ defined directly for I by (3).
Proof. With $p_i$ the probability that item i is included in S, it is known that $\Sigma p_i = k$ since one ended with k items. Hence by Lemma 6, $\Sigma_i \min\{1, w_i/\tau'_k\} = k$. However, $\tau_k$ is defined as the unique value such that $\Sigma_i \min\{1, w_i/\tau_k\} = k$. It is concluded that $\tau'_k = \tau_k$.

From Lemma 4, 6, and 7, it is concluded that (i) is satisfied. Finally, (iii) is to be proven.

Lemma 8. The final sample has no positive covariances as in (iii).

Proof. Since (iii) is satisfied for each internal call, it is known that there are no positive covariances in the adjusted weights $w'_i$ from $I'_x = VAROPT_k(I_x)$. Since these samples are independent, one gets no positive covariances in $w'_i$ of all items in $I' = \bigcup_{x \in [m]} I'_x$. Let $(I^0, w^0)$ denote any possible concrete value of $(I', w')$. Then $$E[\hat{w}_i \hat{w}_j] = \sum_{(I^0, w^0)} (Pr[(I', w')$$
$$= (I^0, w^0)] E[\hat{w}_i, \hat{w}_j \mid (I', w')(I^0, w^0)]) \leq$$
$$\sum_{(I^0, w^0)} (Pr[(I', w') = (I^0, w^0)] w_i^0 w_j^0)$$
$$= E[w'_i w'_j] \leq w_i w_j.$$

Thus it has been shown that the sample S generated satisfies (i), (ii), and (iii), hence that it is a $VAROPT_k$ sample. Thus (5) follows.

Ideal for parallel and distributed settings. Note that one can exploit (5) to compute $VAROPT_k$ efficiently in a parallel or distributed settings, e.g., if $I_1, \ldots, I_m$ represent data sets at different locations, then one can compute each $VAROPT_k(I_m)$ locally, and forward the samples for combination in $VAROPT_k(\bigcup_{x \in [m]} VAROPT_k(I_x))$, 4. An Efficient Implementation.

It will now be shown how to improve $VAROPT_{k, k+1}$ to handle each new item in O(log k) time. Instead of starting from scratch, a reservoir is maintained with a sample R of size k for the items seen thus far. After processing item j, the reservoir is denoted by $R_j$.

In the Section D, it is shown how to process each item in O(1) expected amortized time if the input stream is randomly permuted.

Consider round $j > k$. The first goal is to identify the new threshold $\tau = \tau_{k,j} > \tau_{k,j-1}$. Then subsample k out of the k+1 items in $R_j^{pre} R_{j-1} \cup \{j\}$. Let $\tilde{w}_{(1)}, \ldots, \tilde{w}_{(k+1)}$ be the adjusted weights of the items in $R_j^{pre}$ in sorted order, breaking ties arbitrarily. First identify the largest number t such that $\tilde{w}_{(t)} \leq \tau$. Here $$\tilde{w}_{(t)} \leq \tau \Leftrightarrow k + 1 - t + \frac{\left(\sum_{x \leq t} \tilde{w}_{(x)}\right)}{\tilde{w}_{(t)}} \geq k \Leftrightarrow \frac{\left(\sum_{x \leq t} \tilde{w}_{(x)}\right)}{\tilde{w}_{(t)}} \geq t - 1. \quad (6)$$

After finding t, find $\tau$ as the solution to $$\frac{\left(\sum_{x \leq t} \tilde{w}_{(x)}\right)}{\tau} = t - 1 \Leftrightarrow \tau = \frac{\left(\sum_{x \leq t} \tilde{w}_{(x)}\right)}{(t-1)}. \quad (7)$$

To find the item to leave out, pick a uniformly random number $r \in (0, 1)$, and find the smallest $d \leq t$ such that $$\sum_{x \leq d} (1 - \tilde{w}_{(x)}/\tau) \geq r \Leftrightarrow d\tau - \sum_{x \leq d} \tilde{w}_{(x)} \geq r\tau. \quad (8)$$

Then the dth smallest item in $R_j^{pre}$, is the one dropped to create the sample $S=R_j$.

The equations above suggest that t, τ, and d are found by a binary search. When considering an item during this search, one needs to know the number of items of smaller adjusted weight, and their total adjusted weight.

To perform this binary search, $R_{j-1}$ is divided into two sets. The set L of large items with $w_i > \tau_{k,j-1}$ and $\tilde{w}_i = w_i$, and the set $T = R_{j-1} \setminus L$ of small items whose adjusted weight is equal to the threshold $\tau_{k,j-1}$. L is represented in sorted order by a balanced binary search tree. Each node in this tree stores the number of items in its subtree and their total weight. Represent T in sorted order (here in fact the order could be arbitrary) by a balanced binary search tree, where each node in this tree stores the number of items in its subtree. If the number of items in a subtree of T is multiplied by $\tau_{k,j-1}$ one gets their total adjusted weight.

The height of each of these two trees is O(log k) so one can insert or delete an element, or concatenate or split a list in O(log k) time. (Cormen et al., *Introduction to algorithms*. MIT Press, McGraw-Hill, 2nd edition, 2001. ISBN 0-262-03293-7, 0-07-013151-1.) Furthermore, if one follows a path down from the root of one of these trees to a node v, then by accumulating counters from roots of subtrees hanging to the left of the path, and smaller nodes on the path, one can maintain the number of items in the tree smaller than the one at v, and the total adjusted weight of these items.

Process item j as follows. If item j is large, that is $w_j > \tau_{k,j-1}$, then insert it into the tree representing L. Then find t by searching the tree over L as follows. While at a node v, compute the total number of items smaller than the one at v by adding to the number of such items in L, |T| or |T|+1 depending upon whether $w_j \leq \tau_{k,j-1}$ or not. Similarly, compute the total adjusted weight of items smaller than the one at v by adding $|T|\tau_{k,j-1}$ to the total weight of such items L, and $w_j$ if $w_j \leq \tau_{k,j-1}$. Then use Equation (6) to decide if t is the index of the item at v, or if should proceed to the left or to the right child of v. After computing t, compute τ by Equation (7). Next identify d by first considering item j if $w_j < \tau k j - 1$, and then searching either the tree over T or the tree over L in a way similar to the search for computing t but using Equation (8). Once finding d, the subsample becomes $R_j = S = R_j^{pre} \setminus \{d\}$. All this takes O(log k).

Last, update the representation of the reservoir, so that it corresponds to $R_j$ and $\tau_{k,j}$. Insert $w_j$ into T if $w_j \leq \tau_{k,j-1}$ (otherwise it had already been inserted into L). Also delete d from the list containing it. If $w_{(t)}$ was a large weight, split L at $w_{(t)}$ and concatenate the prefix of L to T. The balanced trees support concatenation and split in O(log k) time, so this does not affect the overall time bounds. Thus, the following theorem has been proven.

Theorem 9. With the above implementation, the reservoir sampling algorithm processes each new item in O(log k) time.

In the above implementation, constant time access to real numbers has been assumed, including the random $r \in (0, 1)$. Real computers do not support real reals, so in practice it is suggested to use floating point numbers with precision $\wp \gg \log n$, accepting a fractional error of order $\frac{1}{2} \wp$.

A Faster Amortized Implementations

A.1 Typical Simple Cases

The processing of a new item is called simple if it is not selected for the reservoir and if the threshold does not increase above any of the previous large weights. It is argued that the simple case is dominating if n>>k, and in Section A.2 a substantial speed-up is obtained by reducing the processing time of the simple case to a constant.

Lemma 6 implies that the reservoir sampling scheme satisfies the condition of the following simple lemma.

Lemma 10 Consider a reservoir sampling scheme with capacity k such that when any stream prefix I has passed by, the probability that i∈I is in the current reservoir is independent of the order of I. If a stream of n items is randomly permuted, then the expected number of times that the newest item is included in the reservoir is bounded by k(ln(n/k)+O(1)). Proof Consider any prefix I of the stream. The average probability that an item i∈I is in the reservoir R is $|R|/|I| \leq k/|I|$. If I is randomly permuted, then this is the expected probability that the last item of I is in R. By linearity of expectation, it is obtained that the expected number of times the newest items is included in R is bounded by $$k + \sum_{j=k+1}^{n} k/j = k(1 + H_n - H_{k+1}) = k(\ln(n/k) + O(1)).$$

As an easy consequence, the following is obtained:
Lemma 11 When applying the reservoir sampling algorithm to a randomly permuted stream, the expected number of times that the threshold passes a weight in the reservoir is bounded by k(ln(n/k)+O(1)).
Proof Since the threshold is increasing, a weight in the reservoir can only be passed once, and it is known from Lemma 10 that the expected number of weights ever entering the reservoir is bounded by k(ln(n/k+O(1)).

A.2 Constant Time Processing of Simple Cases

It is now shown how to perform a simple case in constant time. To do so, the smallest of the large weights in the reservoir in a variable $w_l$ is maintained.

The processing of time j is now started, hoping for it to be a simple case. Assume to know the cardinality of the set T of items in $R_{j-1}$ with weight no higher than $\tau_{k,j-1}$. Tentatively as in (7) compute $$\tau = (w_j + |T|\tau_{k,j-1})/|T|.$$

If $w_j \geq \tau$ or $\tau \geq w_l$, it cannot be in the simple case, so revert to the original implementation. Otherwise τ has its correct value, and proceed to generate the random number $r \in (0,1)$ from the original algorithm. If $(\tau - w_j) > r\tau$, then include the new item, so revert to the original algorithm using this value or r. Otherwise, skip item j setting $\tau_{k,j} = \tau$. No further processing is required, so it is done in constant time. The reservoir and its division into large and small items is unchanged.

Theorem 12 A randomly permuted stream of length n is processed in O(n+k (log k)(log n)) time.
Proof Only constant time is spent in the simple cases. From Lemma 10 and 11, the expected number of non-simple cases is at most 2k(ln(n/k+O(1))=O(k(log(n/k)), and spend only O(log k) time in these cases.

A.3 Simpler Amortized Implementation

Here a simpler implementation of VAROPT$_k$ based on two standard priority queues is presented. This version will also handle the above simple cases in constant time. From a worst-case perspective, this will not be as good because it may spend O(k log log k) time on processing a single item, but on the other hand, it is guaranteed to process any sequence of k items within this time bound. Thus the amortized cost per item is O(log log k), which is exponentially better than the previous O(log k) worst-case bound.

The simple idea is to use a priority queue for the set L of large items, that is, items whose weight exceeds the current threshold τ. The priorities of the large items are just their weight. The priority queue provides the lightest large item l from L in constant time. Assuming integer or floating point representation, one can update L in O(log log k) time. (See M. Thorup. *J. ACM*, 54(6):Art. 28, December, 2007.) The items in T are maintained in an initial segment of an array with capacity for k items.

Now consider the arrival of a new item j with weight $w_j$, and let $τ_{j-1}$ denote the current threshold. All items in T have adjusted weight $τ_{j-1}$ while all other weights have no adjustments to their weights.

A set S is built with items outside T that are known to be smaller than the upcoming threshold $τ_j > τ_{j-1}$. To start with, if $w_j ≤ τ_{j-1}$, set S={j}; otherwise set S=φ and add item j to L.

Items from L are going to be moved to S until L only contains items bigger than the upcoming threshold $τ_j$. For that purpose, the sum W of adjusted weights will be maintained in S∩T. The sum over T is known as $τ_{j-1}|T|$ to which is added $w_j$ if S={j}.

The priority queue over L provides the lightest item l in L. From (6), it is known that l should be moved to S if and only if $$(W+w_l)/w_l ≥ |S|+|T|. \qquad (9)$$

If (9) is satisfied, delete l from L and insert it in S while adding $w_l$ to W. Repeat these moves until L is empty or there will be a contradiction to (9).

The new threshold $τ_j$ can now be computed as $$τ_j = W/(|S|+|T|).$$

The remaining task is to find an item to be deleted based on a uniformly random number r∈(0,1). If the total weight $w_S$ in S is such that $|S|-w_S/τ_j ≥ r$, an item is deleted from S as follows. With S represented as an array, incrementing i starting from 1, stopping as soon as a value such that $i-w_{S[1...i]}/τ_j ≥ r$ is obtained, and then deleting S[i−1] from S, replacing it by the last item from S in the array.

If an item is not deleted from S, just delete a uniformly random item from T. Since T fills an initial segment of an array, just generate a random number i∈[|T|], and set T[i]=T[|T|]. Now |T| is one smaller.

Having discarded an item from S or T, move all remaining items in S to the array of T, placing them behind the current items in T. All members of T have the new implicit adjusted weight $τ_j$. Processing of item j is now complete, ready for the next item to arrive. Theorem 13 The above implementation processes items in O(log log k) amortized time when averaged over k items. Simple cases are handled in constant time, and are not part of the above amortization. As a result, a randomly permuted stream of length n is processed in O(n+k(log log k)(log n)) expected time.

Proof First it is argued that over k items, the number of priority queue updates for L is O(k). Only new items are inserted in L and at the start there was at most k items in L, so the total number of updates is O(k), and each of them take O(log log k) time. The remaining cost of processing a given item j is a constant plus O(|S|) where S may include the new item j and items taken from L. As shown above, only O(k) items can be taken from L over the processing of k items.

In the simple cases, the new item j ends up being skipped in constant time without any changes to L, and hence they can be ignored from the above amortization. Finally, derive the result for randomly permuted sequences as were derived in Theorem 12, but exploiting the better amortized time bound of O(log log k) for the non-simple cases.

Examples

B. Some Experimental Results on Netflix Data

Both the usage and the performance improvement attained by $VAROPT_k$ is illustrated through an example on a real-life data set.

The Netflix Prize (http://www.netflixprize.com/.) data set consists of reviews of 17,770 distinct movie titles by $5×10^5$ reviewers. The weight assigned to each movie title is the corresponding number of reviews.

VAROPT was experimentally compared to state of the art methods. All methods produce a fixed-size sample of k=1000 titles along with an assignment of adjusted weights to the included titles. These summaries (titles and adjusted weights) support unbiased estimates of the weight of subpopulations of titles specified by arbitrary selection predicate. Examples of selection predicates include "PG-13" titles, "single-word" titles, or "titles released in the 1920's." An estimate of the total number of reviews of a subpopulation is obtained by applying the selection predicate to all titles included in the sample and summing the adjusted weights over titles for which the predicate holds.

The titles were partitioned into subpopulations and the sum of the square errors of the estimator was computed over the partition. Natural set of partitions was used based on ranges of release-years of the titles (range sizes of 1, 2, 5, 10 years). Specifically, for partition with range size r, a title with release year y was mapped into a subset containing all titles whose release year is y mod r. Also used was the value r=0 for single-titles (the finest partition).

The methods compared are priority sampling (PRI) (Duffield et al., *J. ACM*, 54(6):Art. 32, December, 2007), ppswor (probability proportional to size sampling with replacement) with the rank-conditioning estimator (ws RC) and ppswor with the subset-conditioning estimator (ws SC) (Cohen et al., *Proc. ACM I F1P Conference on Measurement and Modeling of Computer Systems*, pp. 353-354, 2007 and Cohen et al., *Proceedings of the 34th VLDB Conference*, 2008. TR: http://arxiv.org/abs/0802.3448), and VAROPT. Note that ws SC dominates (has smaller variance on all distributions and subpopulations) ws RC, which in turn, dominates the classic ppswr HorvitzThomson estimator. Results are shown in FIG. 1.

The PRI and ws RC estimators have zero covariances, and therefore, as FIG. 1 shows, the sum of square errors is invariant to the partition (the sum of variances is equal to ΣV). (The slight increase disappears as averaged over more and more runs.)

The ws SC and ws RC estimators have the same ΣV and PRI (M. Szegedy, *Proc. 38th STOC*, pp. 150-158, 2006) has nearly the same ΣV as the optimal VAROPT. Therefore, as the figure shows, on single-titles (r=0), ws RC performs the same as Ws SC and PRI performs (essentially) as well as VAROPT. Since VAROPT has optimal (minimal) ΣV, it outperforms all other algorithms.

Next, larger subpopulations are considered. FIG. 1 illustrates that for VAROPT and the ws SC, the sum of square errors decreases with subpopulation size and therefore they have significant benefit over PRI and ws RC. VAROPT has optimal average variance for any subpopulation size and outperforms ws SC.

VAROPT is strictly better than both PRI and ws SC. (As seen in Section C, there are data sets for which VAROPT$_k$ is much stronger relative to any ppswor scheme, ws SC included, so the performance gains can be much larger than on this particular data set.)

C. Inefficient Case for ppswor

An inefficient instance for probability proportional to size sampling without replacement (ppswor) sampling k out of n items is now provided. Even if ppswor is allowed k+(ln k)/2 samples, it will perform a factor $\Omega(\log k)$ worse on the average variance for any subset size m than the optimal scheme with k samples. Since the optimal scheme has $V\Sigma=0$, it suffices to prove the statement concerning $\Sigma V$. The negative result is independent of the ppswor estimator as long as unsampled items get estimate 0. The proof of this negative result is only sketched below.

Let l=n-k+1. The instance has k-1 items of size l and l unit items. The optimal scheme will pick all the large items and one random unit item.
Hence $\Sigma V$ is $l(1-1/l)l<l^2$.

Now, with ppswor, there is some probability that a large item is not picked, and when that happens, it contributes $l^2$ to the variance. It will be proven that with the first k ppswor samples, approximately ln k samples are wasted on unit items, which are hence missing for the large items, and even if half that many extra samples are obtained, the variance contribution from missing large items is going to be $\Omega(l^2 \log k)$.

For the analysis, suppose one were going to sample all items with ppswor. Let $u_i$ be the number of unit items sampled between the i-1st and the ith large item. Each sample obtained has a probability of almost (k-i)/(k-i+1) of being large. It is "almost" because there may be less than l remaining unit items. However, one wants to show w.h.p. that close to ln k unit items are sampled, so for a contradiction, one can assume that at least l-ln k≈l unit items remain. As a result, the expected number of unit items in the interval is (k-i+1)/(k-i)-1=1/(k-i). This means that by the time one gets to the k-⌈ln k⌉th large item, the expected number of unit samples is $$\sum_{i=1}^{k-\lceil \ln k \rceil} 1/(k-i) \approx \ln k.$$

Since one is adding almost independent random variables each of which is at most 1, there is a sharp concentration, so by the time one gets to the k-⌈ln k⌉ large item, there is approximately ln k unit samples with high probability.

To get a formal proof using Chernoff bounds, for the number of unit items between large item i-1 and i, one can use a pessimistic 0-1 random variable dominated by the above expected number. This variable is 1 with probability 1/(k-i+1)(1-ln k/l) which is less than the probability that the next item is small, and now one has independent variables for different rounds.

D. An $\Omega(\log k)$ Time Lower Bound for Variance Optimal Schemes

The above O(log k) worst-case time implementation is elementary based on standard balanced search trees, but with priority sampling, one has an O(log log k) RAM implementation based on RAM priority queues. (See M. Thorup. *J. ACM*, 54(6):Art. 28, December, 2007.) Thus it is assumed that floating point numbers are used with precision $\wp \gg \log n$, accepting a fractional error of order ½ $\wp$. Here it is argued that one cannot use the RAM to get any corresponding improvement if one wants to optimize $\Sigma V$. It is known that if one wants to minimize $\Sigma V$ then $\tau$ is among estimators, so it is necessary to compute $\tau$ which is the unique number satisfying $$\sum_{i \in R} \min\{1, \tilde{w}_i / \tau\} = k \Leftrightarrow \sum \{\tilde{w}_i \mid i \in R, \tilde{w}_i \leq \tau\}$$
$$= \tau(k - |\{\tilde{w}_i \mid i \in R, \tilde{w}_i > \tau\}|).$$

Using O(log n/log log n) dynamic rank based on atomic heaps by Freedman et al., *J. Comput. Syst. Sci.*, 48:533-551 (1994), it is not hard to prove that if one could identify $\tau$ in sublogarithmic time, then one would be able to solve prefix sum in sublogarithmic time, contradicting a RAM lower bound for the incremental case of $\Omega(\log n)$ from Pătraşcu et al., (*SIAM Journal on Computing*, 35(4):932-963 (2006)) and Pătraşcu et al., (*Theoretical Computer Science*, 380: 127-142 (2007)). This lower bound is for integer weights in words, but that can be simulated with floating point numbers with a corresponding precision.

In one embodiment, the invention includes a tangible computer-readable carrier in accordance with the present invention, which incorporates some of the preferred features, includes instructions, wherein execution of the instructions by at least one computing device obtains a generic sample of an input stream. A Sample S is generated from an input stream of items i, wherein the Sample S comprises at most k items i. It is determined whether an $n^{th}$ item i of the input stream should be included in Sample S, wherein n=k+1, while maintaining at most k items i in Sample S, by computing a VAROPT$_k$ sample of a set I. The set I comprises (or consists of) n items i, including the original k items i and the $n^{th}$ item i. The computation of a VAR$_{OPT_k}$ sample comprises computing a threshold $\tau_k$ such that $\Sigma_{i \in [n]} \min\{1, \tilde{w}_i/\tau_k\}=k$, wherein $\tilde{w}_i$ is adjusted weight of item i; including an item i in Sample S with probability $p_i=\min\{1, \tilde{w}_i/\tau_k\}$ and dropping an item i with probability $q_i=1-p_i$, wherein $\Sigma_{i \in I}q_i=n-k=1$; partitioning unit interval [0,1] into a segment of size $q_i$ for each i with $q_i>0$; picking a random point r∈[0,1], wherein r hits the interval of some d∈I, wherein d is a dropped item; dropping d and setting Sample S=I\{d}, thereby updating Sample S; and setting $\tilde{w}_i=\tau_k$ for each i∈S with $\tilde{w}_i<\tau_k$. Preferably, for each item i∈S, a weight estimate $\tilde{w}_1$ is stored on-line.

In another embodiment, the invention includes a system for obtaining a generic sample of an input stream. The system comprises a generating module and a determination module. The generating module is arranged to generate a Sample S from an input stream of items i, wherein the Sample S comprises of at most k items i. The determination module arranged to determine whether an $n^{th}$ item i of the input stream should be included in Sample S, wherein n=k+1, while maintaining at most k items i in Sample S, by computing a VAR$_{OPT_k}$ sample of a set I, wherein the set I comprises the n items i. The determination is made by computing a threshold $\tau_k$ such that $\Sigma_{i \in [n]} \min\{1, \tilde{w}_i/\tau_k\}=k$, wherein $\tilde{w}_i$ is adjusted weight of item i; including an item i in Sample S with probability $p_i=\min\{1, \tilde{w}_i/\tau_k\}$ and dropping an item i with probability $q_i=1-p_i$, wherein $\Sigma_{i \in I}q_i=n-k=1$; partitioning unit interval [0,1] into a segment of size $q_i$ for each i with $q_i>0$; picking a random point r∈[0,1], wherein r hits the interval of some d∈I, wherein d is a dropped item; dropping d and setting Sample S=I\{d}, thereby updating Sample S; and setting $\tilde{w}_i=\tau_k$ for each i∈S with $\tilde{w}_i<\tau_k$. Preferably, for each item i∈S, a weight estimate $\tilde{w}_i$ is stored on-line.

It is understood that the systems, methods and modules described herein can be implemented in hardware, software, or a combination of hardware and software. They can be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. In a further embodiment, part of all of the invention could be implemented in a distributed manner, e.g., over a network such as the Internet.

The present invention can also be embedded in a computer program product, which comprises all the features enabling the implementation of the methods and systems described herein, and which, when loaded in a computer system, is able to carry out these methods and functions. Computer program in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the invention has been presented for purposes of illustration and description. It is not intended to be exhaustive or to limit the invention to the precise form disclosed, and many modifications and variations are possible. Such modifications and variations that may be apparent to a person skilled in the art are intended to be included within the scope of this invention as defined by the accompanying claims.

What is claimed is:

1. A non-transitory computer-readable carrier comprising instructions configured to cause at least one computing device to obtain a generic sample of an input stream of packets associated with a computer network to estimate a total weight of a subset of the input stream using the generic sample by:
   (a) generating a sample S from an input stream of items i, the sample S including at most k items i; and
   (b) determining whether an $n^{th}$ item i of the input stream should be included in sample S, n=k+1, at most k items i being maintained in sample S, by computing $VAROPT_k$([n]), which is a $VAROPT_k$ sample of a set I, the set I including n items i, by:
      (1) computing a threshold $\tau_k$ such that $\Sigma_{i\in[n]}$min$\{1, \tilde{w}_i/\tau_k\}$=k, $\tilde{w}_i$ being an adjusted weight of item i;
      (2) including item i in sample S with probability $p_i$=min$\{1, \tilde{w}_i/\tau_k\}$ and dropping item i with probability $q_i$=1−$p_i$, wherein $\Sigma_{i\in I}q_i$=n−k=1;
      (3) partitioning a unit interval [0,1] into a segment of size $q_i$ for each i with $q_i$>0;
      (4) selecting a random point r∈[0,1], r being within an interval of d∈I, d being a dropped item;
      (5) dropping d and setting sample S=I\{d}, thereby updating sample S; and
      (6) setting $\tilde{w}_i=\tau_k$ for each i∈S with $\tilde{w}_i<\tau_k$, thereby obtaining a generic sample of the input stream, wherein average variance ($V_m$) of weight estimates is simultaneously minimized over a plurality of subsets of the input stream, and
wherein ΣV and VΣ are minimized such that $$\sum V = \sum_{i\in[n]} \text{Var}[\hat{w}_i]$$
$$= nV_1$$

and $$V\sum = \text{Var}\left[\sum_{i\in[n]}\hat{w}_i\right]$$
$$= \text{Var}[\hat{w}_{[n]}]$$
$$= V_n.$$

wherein ΣV is a sum of individual variances, VΣ is a variance of the estimate of total.

2. The non-transitory computer-readable carrier of claim 1, further comprising instructions that, when executed by a computing device, cause the device to: repeat step (b) with another $n^{th}$ item i and an updated sample S.

3. The non-transitory computer-readable storage carrier of claim 1, wherein $VAROPT_k([n])=VAROPT_k(VAROPT_k([n-1])\cup\{n\})$.

4. The non-transitory computer-readable storage carrier of claim 1, wherein for each item i∈S, a weight estimate $\tilde{w}_i$ is stored on the network.

5. The non-transitory computer-readable storage carrier of claim 4, wherein a weight estimate is unbiased.

6. The non-transitory computer-readable storage medium of claim 5, wherein an unbiased estimate is $\hat{w}_i=w_i/\text{Pr}[i\in S]$ if i∈S, where $w_i$ is weight of item i.

7. The non-transitory computer-readable storage carrier of claim 5, wherein there are no positive covariances between a pair of weight estimates.

8. The non-transitory computer-readable storage carrier of claim 1, wherein I has a weight-bounded variance of Var[$\hat{w}_i$]≦$w_i w_{[n]}$/k.

9. The non-transitory computer-readable storage carrier of claim 1, wherein I has a cardinality-bounded variance Var[$\hat{w}_I$]≦|I|($w_{[n]}$/2k)$^2$.

10. The non-transitory computer-readable storage carrier of claim 1, wherein each item of the input stream is sampled in O(log k) worst-case time.

11. The non-transitory computer-readable storage carrier of claim 1, wherein an expected number of times that a threshold passes an adjusted weight in sample S is bounded by k(ln(n/k)+O(1)).

12. The non-transitory computer-readable storage carrier of claim 1, wherein the subset belongs to a specified protocol.

13. The non-transitory computer-readable storage carrier of claim 12, wherein the subset is analyzed for applications selected from the group consisting of anomaly detection, routing and billing.

14. The non-transitory computer-readable storage carrier of claim 1, wherein the subset originates from a specified source.

15. The non-transitory computer-readable storage carrier of claim 1, wherein the subset belongs to a particular application.

16. A system for obtaining a generic sample of an input stream of packets associated with a computer network to estimate a total weight of a subset of the input stream using the generic sample comprising:
  (a) a generating device configured to generate a sample S from an input stream of items i, the sample S including at most k items i; and
  (b) a determination device configured to determine whether an $n^{th}$ item i of the input stream should be included in sample S, n=k+1, at most k items i being maintained in sample S, by computing $VAROPT_i([n])$, which is a $VAROPT_k$ sample of a set I, the set I including n items I, by:
    (1) computing a threshold $\tau_k$ such that $\Sigma_{i\in[n]}$min$\{1, \tilde{w}_i/\tau_k\}$=k, $\tilde{w}_i$ being an adjusted weight of item i;
    (2) including item i in dample S with probability $p_i$=min$\{1, \tilde{w}_i/\tau_k\}$ and dropping item i with probability $q_i$=1−$p_i$, $\Sigma_{i\in I}q_i$=n−k=1;
    (3) partitioning a unit interval [0,1] into a segment of size $q_i$ for each i with $q_i$>0;
    (4) selecting a random point r∈[0,1], r being within an interval of d∈I, d being a dropped item;
    (5) dropping d and setting sample S=I\{d}, thereby updating sample S; and
    (6) setting $\tilde{w}_i=\tau_k$ for each i∈S with $\tilde{w}_i<\tau_k$, thereby obtaining a generic sample of the input stream,
  wherein average variance ($V_m$) of weight estimates is simultaneously minimized over a plurality of subsets of the input stream, and
  wherein ΣV and VΣ are minimized such that $$\sum V = \sum_{i\in[n]} \text{Var}[\hat{w}_i] = nV_1 \text{ and } V\sum = \text{Var}\left[\sum_{i\in[n]} \hat{w}_i\right] = \text{Var}[\hat{w}_{[n]}] = V_n,$$

wherein ΣV is a sum of individual variances, VΣ is a variance of the estimate of total.

17. The system of claim 16, wherein for each item i∈S, a weight estimate $\tilde{w}_i$ is stored on the network.

* * * * *